Figure 1:
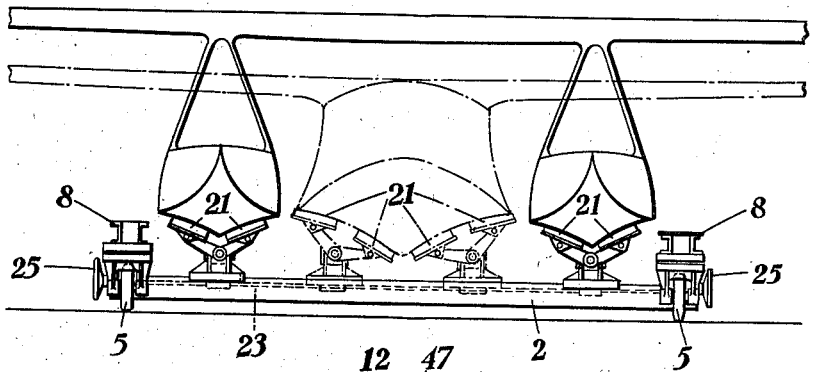

Feb. 15, 1938.  W. G. GLOVER  2,108,747
LAUNCHING AND BEACHING OF AIRCRAFT
Filed May 29, 1936  7 Sheets-Sheet 1

INVENTOR
William G. Glover.
BY
William C. Linton,
ATTORNEY

Feb. 15, 1938. W. G. GLOVER 2,108,747
LAUNCHING AND BEACHING OF AIRCRAFT
Filed May 29, 1936   7 Sheets-Sheet 2

INVENTOR
William G Glover.
BY
William C. Linton.
ATTORNEY

Feb. 15, 1938.  W. G. GLOVER  2,108,747
LAUNCHING AND BEACHING OF AIRCRAFT
Filed May 29, 1936    7 Sheets-Sheet 3
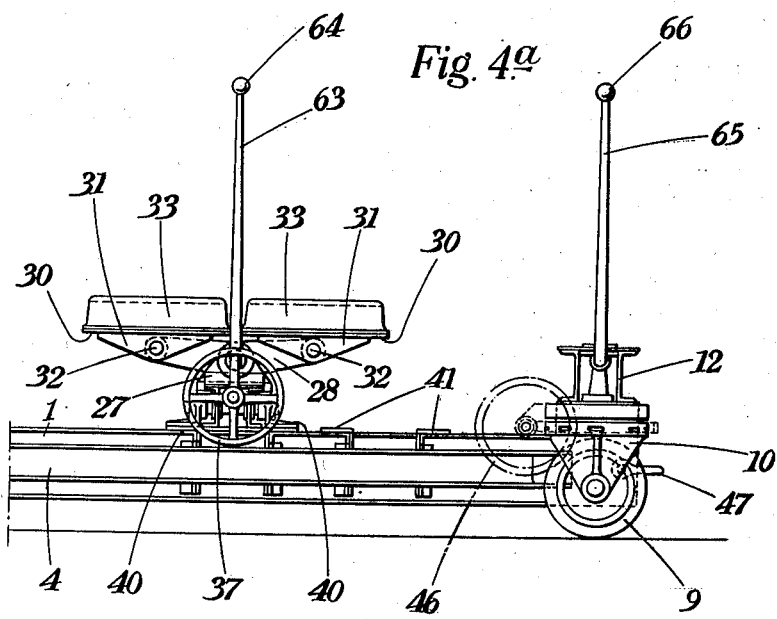
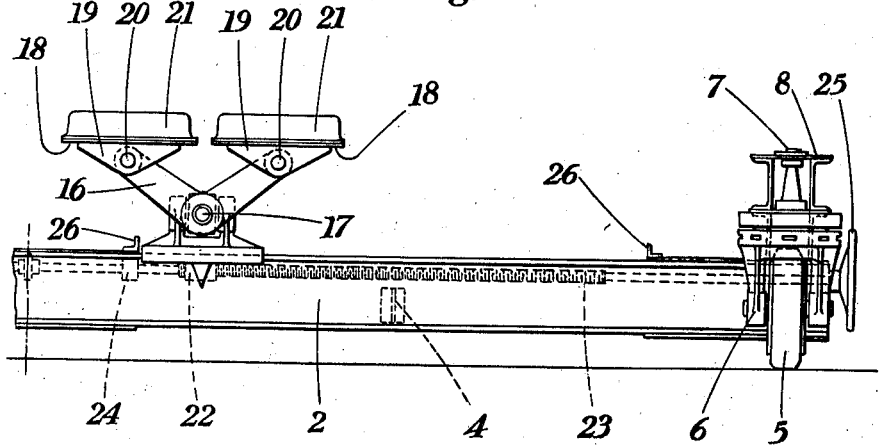
INVENTOR
William G. Glover.
BY
William C. Linton.
ATTORNEY

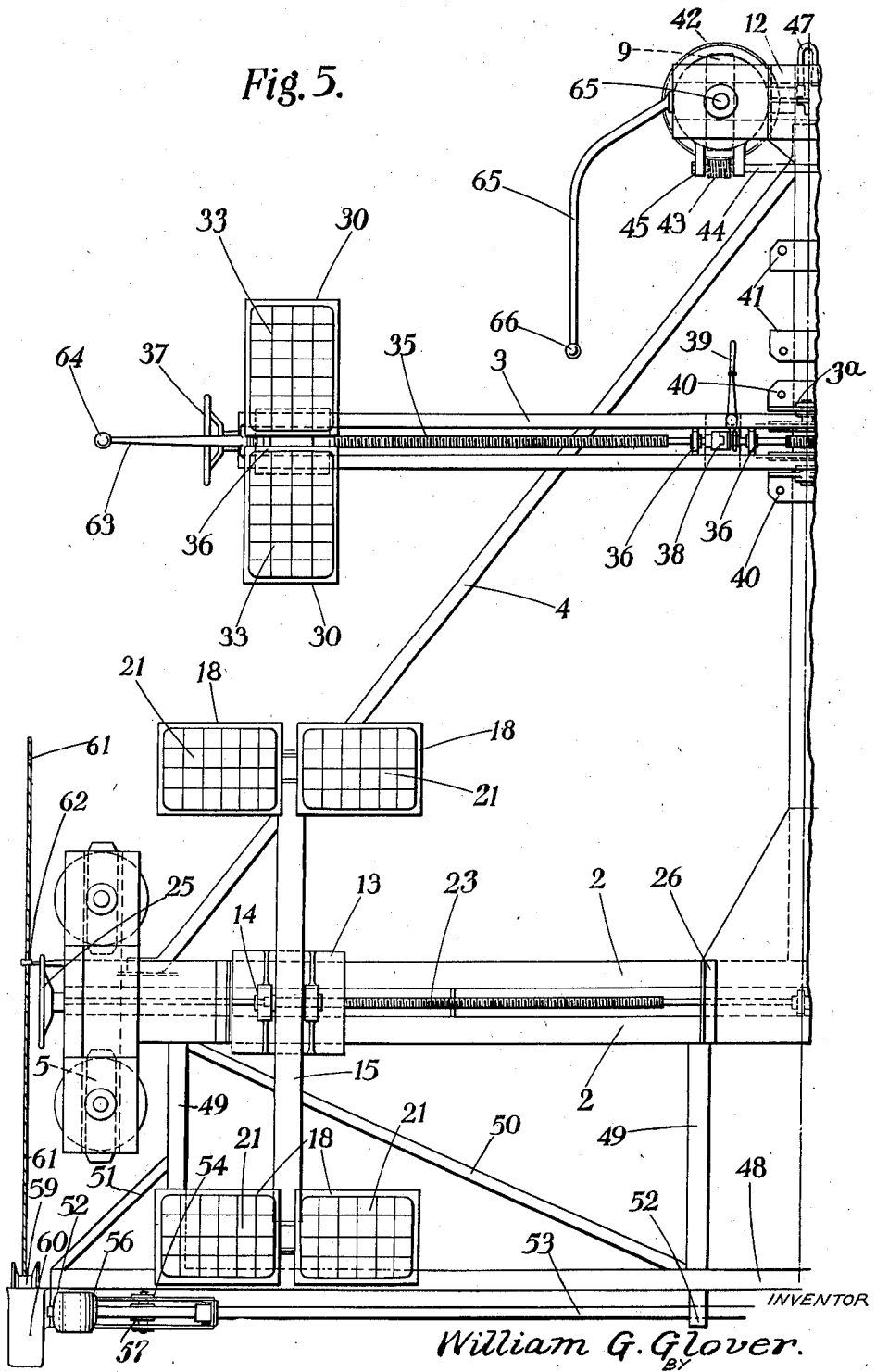

Feb. 15, 1938.  W. G. GLOVER  2,108,747
LAUNCHING AND BEACHING OF AIRCRAFT
Filed May 29, 1936  7 Sheets-Sheet 5

INVENTOR
William G. Glover
BY
William C. Linton.
ATTORNEY

Feb. 15, 1938.  W. G. GLOVER  2,108,747
LAUNCHING AND BEACHING OF AIRCRAFT
Filed May 29, 1936   7 Sheets-Sheet 7

William G. Glover. INVENTOR
BY William C. Linton.
ATTORNEY

Patented Feb. 15, 1938

2,108,747

UNITED STATES PATENT OFFICE 2,108,747

LAUNCHING AND BEACHING OF AIRCRAFT

William Gordon Glover, London, England

Application May 29, 1936, Serial No. 82,592
In Great Britain May 31, 1935

5 Claims. (Cl. 280—1)

This invention relates to the handling of aircraft of the seaplane and amphibian types, when launching and beaching a craft via a slipway, and it has for its principal object to provide a universal apparatus capable of dealing with any of such aircraft, irrespective of whether it be a boat seaplane (flying boat), a float seaplane, a boat amphibian, or a float amphibian; another object being to obviate the necessity for sending into the water any persons for the purpose of manœuvering the craft from or on to the launching or beaching apparatus, and a further object being to provide launching or beaching apparatus capable without structural alteration of accommodating aircraft of the boat seaplane type over a wide range of weight and dimensions, and irrespective of their design.

At present the launching and beaching of aircraft of the above types, particularly boat seaplanes, involves, in one method, fitting to a trolley a detachable unit embodying a series of transverse chocks each of which must of necessity be designed to the specific section and dimensions of each individual aircraft to be dealt with, and, furthermore, it is necessary, at all times to send a number of men into the water in order to position an aircraft on these chocks with the greatest accuracy before it can be safely beached.

Another method, also in common use, employs a detachable undercarriage composed of two units, each comprising a wheel or wheels, pneumatically-tired and mounted in a triangulated framework of struts, furnished with means of adjustment, and special provision is made on the aircraft for the attachment thereto of said struts, and for the necessary stiffening in the structure of the hull to withstand the high localized loads which must accrue when the weight of the aircraft is borne by this apparatus: such fittings and the stiffening of the structure entailing additional weight to be carried by the aircraft, and resulting in consequence in a considerable reduction in pay-load.

In practice, the aircraft is brought to a convenient position fronting the slipway and the two units of the aforesaid detachable undercarriage are either run down the slipway or floated out to the craft and the struts are engaged with their respective points of attachment, incorporated in the hull, while the craft is afloat. The operation of engagement is performed at considerable inconvenience, partly under water, and when the attachment has been made, the aircraft is hauled up the slipway upon the undercarriage, the tail being supported by a simple form of trolley, which is introduced at the earliest possible moment.

The principal disadvantages of the two above-mentioned launching and beaching systems are obviated by this invention and both systems can be superseded. Moreover, where circumstances render it advisable, the universal apparatus of this invention is capable of co-operation with the second system by permitting the attachment of the components of the undercarriage to the hull of an aircraft to be effected on dry land, i. e. on the slipway, on a marshalling platform or in a hangar.

Accordingly, for launching or beaching aircraft of the seaplane and amphibian types via a slipway, the invention comprises a mobile cradle embodying structurally a plurality of self-seating supports capable of accommodating, with substantially uniform contact pressure throughout, any type of seaplane or amphibian within a wide range of weight and dimensions; and further, provided with devices for centering the aircraft over said supports, said centering devices being operable from ashore when the cradle is in the water.

Each of the aforesaid self-seating supports comprises a plurality of abutment members, faced with or formed of pads of resilient material, pivoted to the mobile cradle and located preferably in groups in such a manner as to conform to the contours of the planing surfaces of the craft and also with the contour of the keel thereof when the craft is received either for launching or beaching, as the case may be, the fundamental load being borne at three or more points.

In order to render the cradle universal for aircraft irrespective of their type, those abutment members intended for contact with the planing surfaces of the craft are adjustable laterally with respect to the center line of the cradle and those abutment members destined to support the keel of the craft are adjustable both longitudinally and laterally with respect to said center line. For aircraft of the boat seaplane type, however, the cradle is capable of accepting a craft over a wide range of weight and dimensions without fitting the abutment members adjustably with respect to the center line of the cradle. The abutment members may therefore be mounted adjustably or otherwise as circumstances may require.

In the case of aircraft of very large dimensions, the abutment members for making contact with the planing surfaces of the craft may be arranged so as to be elevated in relation to the cradle simultaneously into supporting contact with said surfaces by hydraulic, electrical, or mechanical means, or any appropriate combination thereof; means or devices being provided in order to hold said abutment members positively in their elevated positions, and means being preferably provided for controlling the degree of pressure under which the abutment members are brought into contact with the craft. For example, at a calculated or determined pressure the arrangement may be such that the elevation of the abutment members is automatically arrested.

In order to assist in manoeuvering the cradle it is mounted upon a plurality of castor wheels capable of being locked in a number of different angular positions of adjustment.

In order to enable the craft to be brought into any desired trim for the purpose of effecting adjustments to the planes or other parts of the craft, or for the purpose of relieving the load on the wheels when altering their angular position, a system of jacks, operated either mechanically or hydraulically, may be incorporated in the cradle at three or more points.

One constructional embodiment of the invention is illustrated by way of example in the accompanying drawings, in which:—

Figure 2:
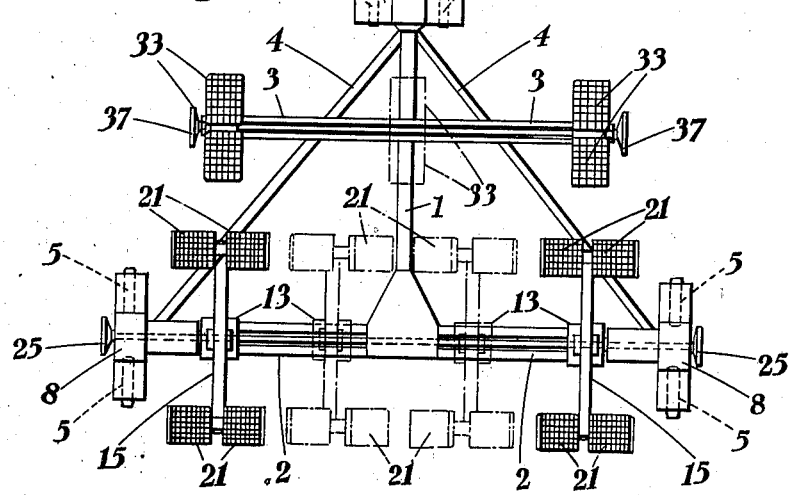
Figure 3:
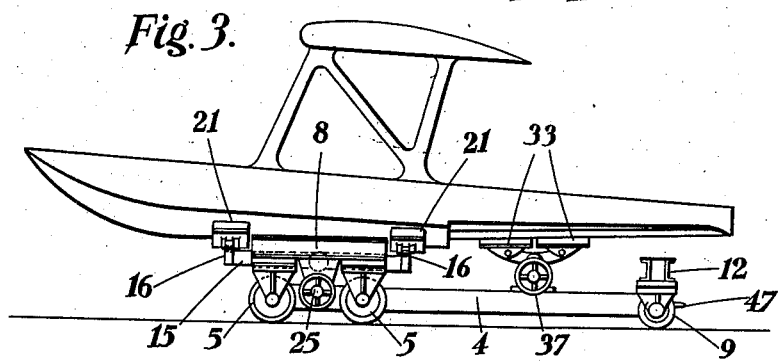

Figures 1, 2 and 3 are diagrammatic front, plan and side views, respectively, showing in full lines the mobile cradle arranged for float seaplanes, and in dot-and-dash lines for boat seaplanes.

Figure 4:
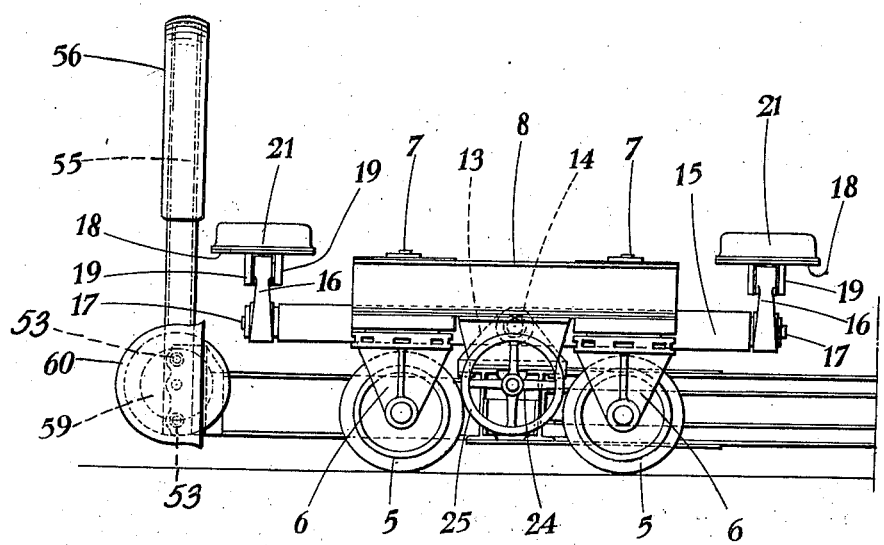
Figure 6:
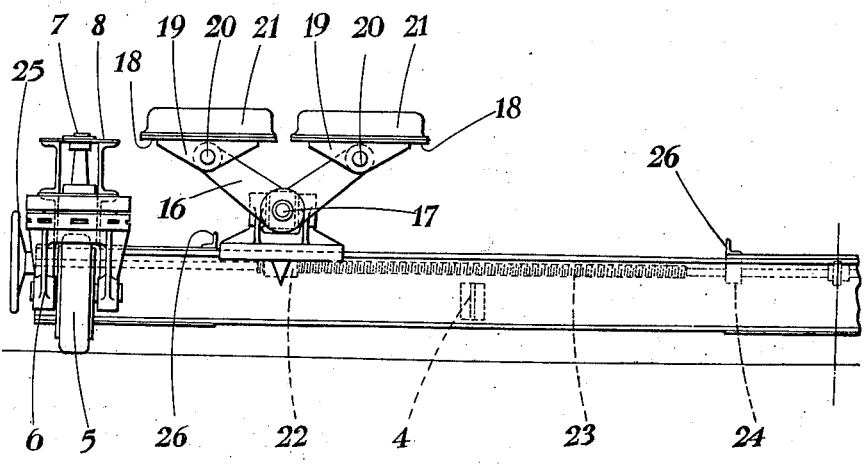
Figure 5A:
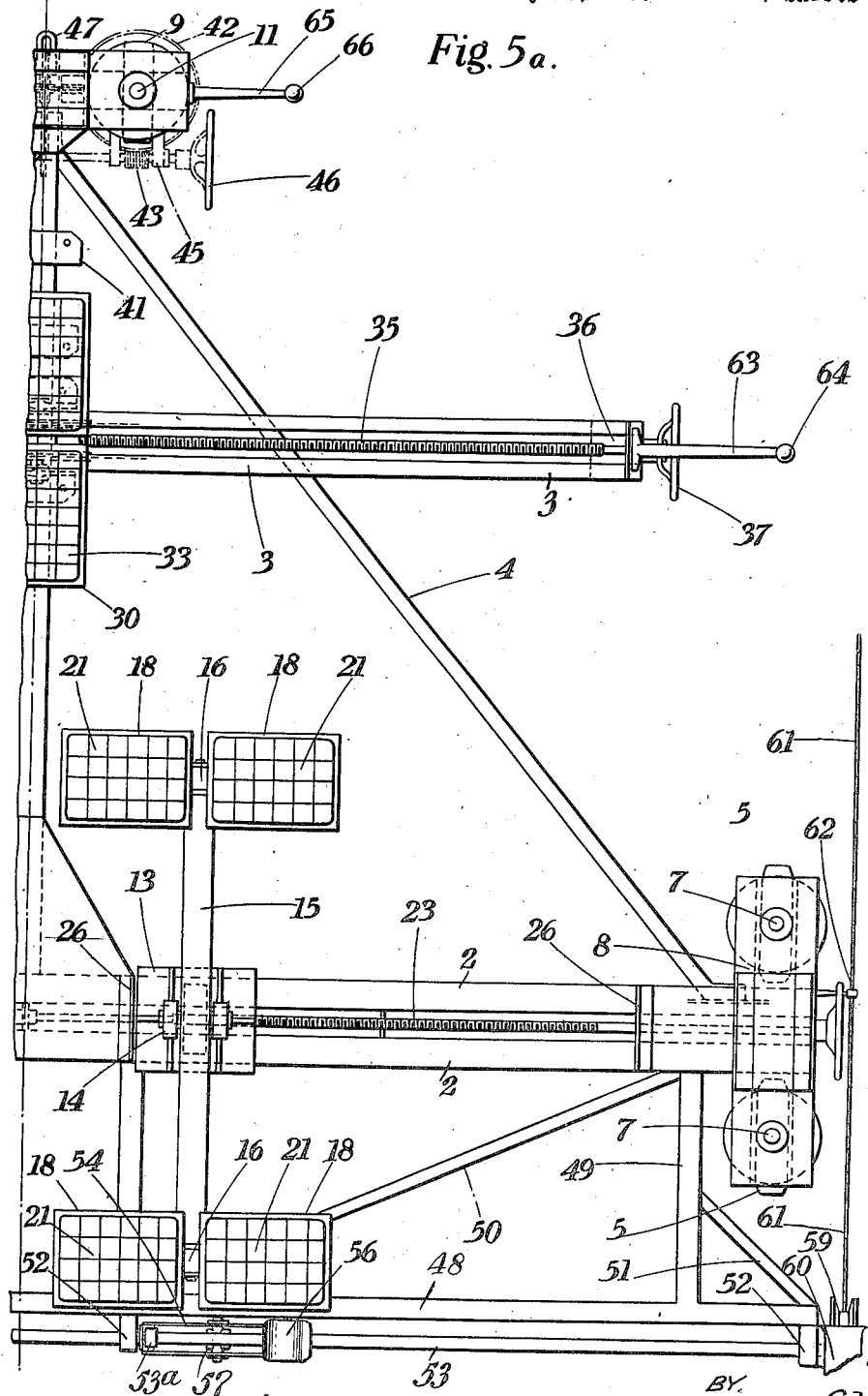
Figure 7:
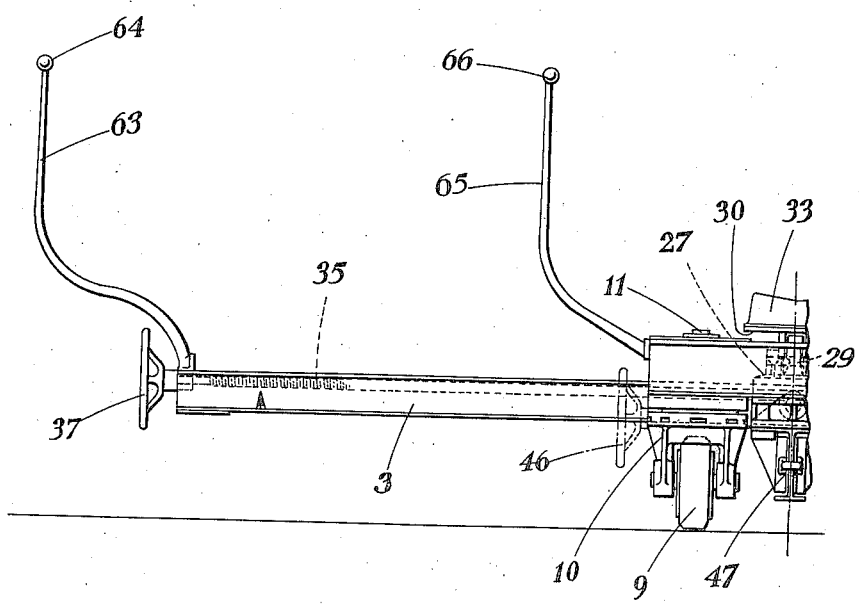
Figure 8:
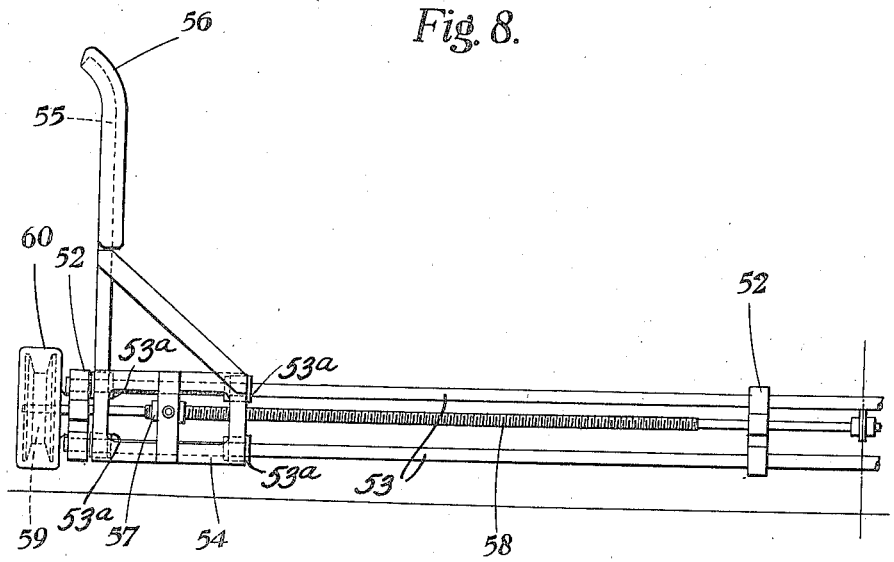
Figure 7A:
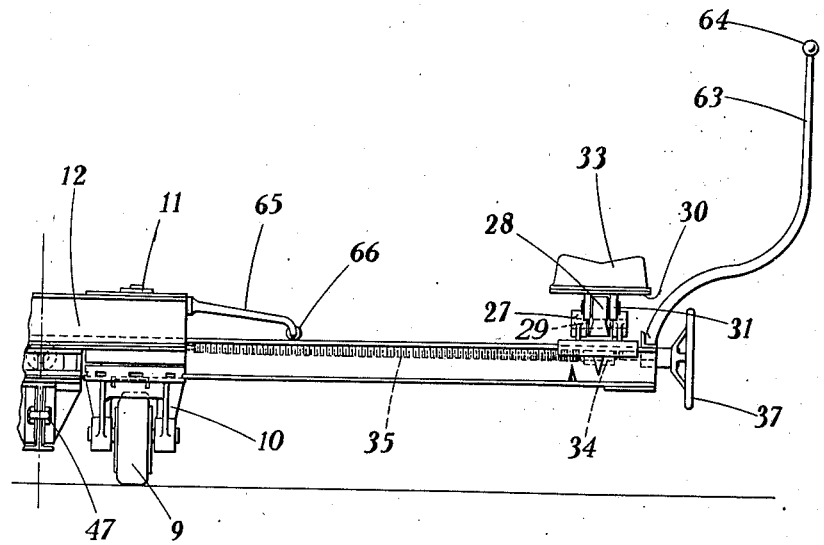
Figure 8A:
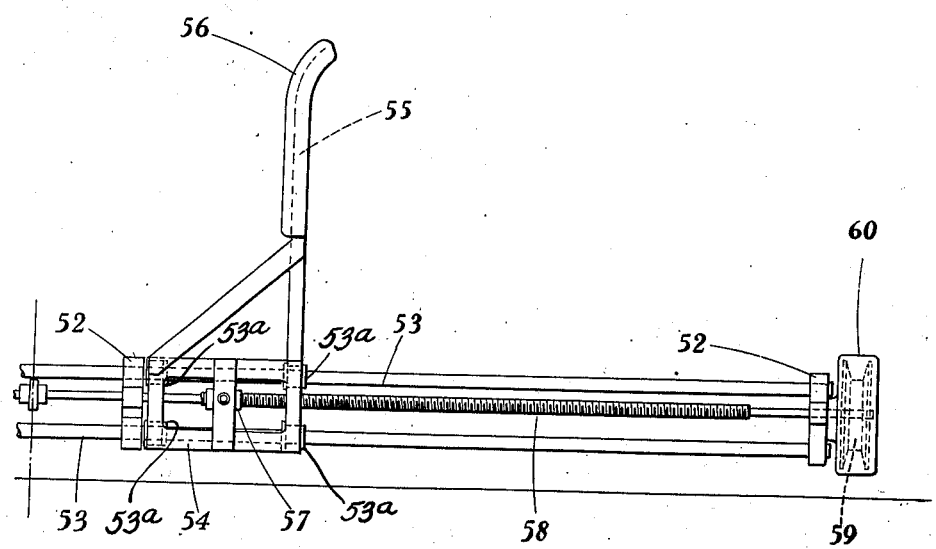

Figures 4 to 8 illustrate the cradle only. Figures 4 and 4a are complementary views in side elevation, and Figures 5 and 5a are half plan views in the former of which the supports are positioned to accommodate a float seaplane and in the latter a boat seaplane. Figures 6 and 6a are front elevations of Figures 5 and 5a, respectively, the centering mechanism being omitted, and Figures 7 and 7a are rear elevations of Figures 5 and 5a. Figures 8 and 8a are detail front views of the centering mechanism.

In these drawings the frame of the mobile cradle is composed of a longitudinal beam or girder 1, a main transverse or thwartship beam comprising a pair of parallel spaced girders 2, and a secondary transverse or thwartship beam built of a pair of parallel spaced girders 3, free to oscillate on an arbor 3a (Fig. 5) within narrow limits and located intermediately of the tail end of the longitudinal beam and said main transverse or thwartship beam which is braced to the longitudinal beam near its after end by two struts 4.

At each end of the main thwartship beam 2, the cradle is supported on pairs of tandem rubber-tired wheels 5 mounted in forked bearing brackets 6 each of which is pivoted by a vertical arbor 7 to an auxiliary beam or girder 8 secured at each end of the beam 2. The mounting of the forked bearing brackets 6 is such as to enable each wheel 5 to be set to and locked in any one of eight angular positions of adjustment as may be necessary when manoeuvering the cradle.

Similarly, the after end of the cradle is supported by a pair of rubber-tired wheels 9 each mounted in a forked bearing bracket 10 pivoted by a vertical arbor 11 carried by a short transverse beam 12 secured to the tail end of the beam 1.

Slidably mounted on the main thwartship beam 2 are two forked bearing brackets 13 to each of which is pivoted by means of an arbor 14 a main balance arm 15 at each extremity of which a secondary balance arm 16 is pivoted upon a journal 17, the secondary balance arms being disposed at right angles to the main balance arms, and at each extremity of each of said secondary balance arms 16 there is pivoted a metal plate 18 formed beneath with integral apertured flanges 19 connected by an arbor 20 with the apertured end of each secondary balance arm 16; each plate 18 being faced with rubber blocks 21 constituting resilient bolsters to support the planing surfaces of an aircraft.

Integral with or carried below each forked bearing bracket 13 is a nut 22 which takes over a screw-threaded rod 23 carried by bearings 24 on the beam 2 and having a handwheel 25 secured at each of its outer ends; the thread on one half of the rod 23 being right handed and on the other half left handed. Four flanged stops 26 are fixed to the beam 2 which limit the extent of sliding movement of the aforesaid bearing brackets 13 within a range wide enough to accommodate any craft hitherto designed and built.

On the secondary thwartship beam 3 there are mounted slidably two forked bearing brackets 27 to each of which a balance arm 28 is pivoted by means of an arbor 29 and to each apertured end of each of said balance arms 28 a metal plate 30 having integral apertured depending flanges 31 is pivoted by an arbor 32, (see Fig. 4a) these plates 30 being faced with rubber blocks 33, similarly to the plates 18, constituting resilient bolsters to support the keel of the craft, abaft the step.

Integral with or carried by each forked bearing bracket 27 is a nut 34 taking over a screw-threaded rod 35 carried in bearings 36 on the beam 3 and having a handwheel 37 secured at each of its outer ends; the thread on one half of the rod being right handed and on the other half left handed and the rod being divided centrally and its two halves connected by means of a sliding dog-clutch 38 having an operating hand-lever 39.

Two angle pieces 40 are bolted or riveted to the beam 1 in order to locate and support the arbors 3a of secondary thwartship beam 3, and 41 are similar pieces situated in an alternative position slightly further aft.

It will be seen that the pivotal mounting of the elements of the cradle, as described above, is such that the abutment members are free to oscillate longitudinally and laterally of the cradle.

Keyed to each arbor 11 of the wheels 9 at the tail end of the beam 1 is a worm wheel 42 with which mesh worms 43 carried by a worm spindle 44 mounted in bearings 45 secured to the tail beam 12, said worm spindle 44 being fitted with an operating handwheel 46 whereby the angular position of the wheels 9 can be adjusted according to requirements. Each pair of wheels 5 may, if desired, be coupled in the same manner, and above each of all the wheels there may be a circular scale with which there may co-operate a pointer movable with the appropriate vertical arbor 7 or 11 in order to indicate the angular adjustment imparted to each wheel 5 or 9. Furthermore, suitable means, not shown, may be employed to lock each wheel in its angular position of adjustment.

47 is a shackle secured to the tail end of the longitudinal beam 1 for the attachment thereto of a hauling wire.

In order that an aircraft may be correctly centered over the cradle before its reception thereby, special gear is provided for that purpose and is carried by a framing 48, 49, 50 and 51, extended forwardly from and secured to the main thwartship beam 2, from the member 48 of which framing there project brackets 52 supporting a pair of fixed transverse slide rods 53 upon which are sleeved at 53a two frames or carriages 54 each constructed at its outer side with an upwardly extending and outwardly curved horn 55 covered with a rubber sheath 56.

Each frame or carriage 54 carries a nut 57 working on a screw-threaded shaft 58 carried in bearings in the brackets 52 and whereof the thread on one half is right handed and that on the other half is left handed, and on each outer extremity of the screw-threaded shaft 58 is keyed a drum or pulley 59 provided with a shroud 60. To each drum or pulley 59 the end of a rope 61 is made fast, the ropes being reaved around the drums 59 and being of sufficient length to extend through two fairleads 62 on the main thwartship beam 2 and to remain ashore when the cradle is sent into the water.

At the ends of the secondary thwartship beam 3 is fixed rigidly a pair of curved antennae 63 each having a spherical knob 64 at the top serving as sighting points for directing on to the cradle aircraft of the float seaplane type, while at the ends of the tail beam 12 there is mounted collapsibly a similar pair of antennae 65 each having a spherical knob 66 at the top serving as sighting points for directing on to the cradle aircraft of the boat seaplane type.

It will be apparent that by turning the handwheels 25 and thus rotating the screw-threaded shaft 23, the bearing brackets 13 can be positioned on the thwartship beam 2 at such a distance from the center line of the cradle as is requisite either to offer support to the hull of a boat seaplane, in which case each bracket 13 would be located relatively close to the beam 1 as shown in dot-and-dash lines in Figure 2 and in Figure 5a, or to offer support to the floats of a float seaplane, in which case each bracket 13 would be located towards the outer ends of the thwartship beam 2 exactly where required according to the distance separating the center lines of the floats of the particular float seaplane in question, as shown in full lines in Figure 2 and in Figure 5. Similarly, by turning one of or both of the handwheels 37 to rotate one de-clutched half or both halves solidly of the screw-threaded shaft 35, either one of the bearing brackets 27 can be positioned coincidently with the center line of the beam 1 in order to offer support to the keel of a boat seaplane abaft the step thereof, as shown in dot-and-dash lines in Figure 2 and in Figure 5a, or both the bearing brackets 27 can, as shown in full lines in Figures 2 and 5 be positioned at or near the ends of the secondary thwartship beam 3 coincidently with the center lines of the after ends of the floats of the aforesaid float seaplane.

Therefore, in accordance with the type of aircraft that it is desired to beach, for example, up a slipway by means of the above described apparatus, the cradle is first conditioned by making the requisite adjustments in the positions of the bolsters in respect to the center line of the cradle which is then lowered, by appropriate haulage gear and a haulage wire connected to the shackle 47, down the slipway to a point at which there is sufficient draught of water to enable the aircraft in question to flat clear over the supports on the cradle, and as the craft tail-first approaches the shore, either under its own power or by manual propulsion, a headline is cast ashore from the craft and made fast either to the main haulage wire of the cradle or to a winch provided for the purpose, and the craft is manoeuvered into a position over the cradle relatively to which it is accurately centered by the horns 55 by drawing appropriately on the ropes 61 so as to revolve the drums 59 and screwed shaft 58, thus causing the carriages 54 to be moved inwardly by the nuts 57; the sighting antennae or posts 63 or 65 being utilized also to determine the correct relative position of the craft.

As soon as the positioning is completed, the strain is taken on the main haulage wire and the headline from the craft so that the cradle and the floating craft are drawn ashore at the same speed, and, as soon as the draught has been sufficiently reduced by the cradle moving up the slipway, the craft settles down on to the fore and aft groups of abutment members or bolsters which, as stated above, conform automatically to the respective contours of the planing surfaces and the keel.

Instead of being provided with rubber tired wheels, as illustrated, the mobile cradle may be fitted with flanged wheels to enable it to operate on a rail slipway.

Again, instead of being slidable on the thwartship and longitudinal beams of the cradle, the bearing brackets for the self-seating supports may be mounted in fixed positions appropriate either to the boat or float type of seaplane, in which circumstances although the range of utility of the cradle is diminished as compared with that of the above described construction, the necessity for designing special apparatus for each individual craft can still be dispensed with, since even with the supports in fixed positions the cradle is operative over a range of craft.

What I claim is:—

1. Improvement in apparatus for handling aircraft of the seaplane and amphibian types when launching and beaching an aircraft via a slipway, comprising a mobile submersible cradle, a plurality of abutment members mounted on said cradles and articulated so as to be free to oscillate longitudinally and laterally to conform to the contours of an aircraft, and means mounted on said cradle operable from ashore for centering an aircraft above said abutment members when said cradle is in the water.

2. Improvement in apparatus for handling aircraft of the seaplane and amphibian types when launching and beaching an aircraft via a slipway, comprising a mobile submersible cradle, a plurality of abutment members adjustably mounted on said cradle and articulated so as to be free to oscillate longitudinally and laterally to conform to the contours of an aircraft with substantially uniform contact pressure throughout, means to adjust the positions of said articulated abutment members, and means mounted on said cradles operable from ashore for centering an aircraft above said abutment members when said cradle is in the water.

3. Improvement in apparatus for handling aircraft of the seaplane and amphibian types when launching and beaching an aircraft via a slipway, comprising a mobile submersible cradle, a plurality of abutment members articulated so as to be free to oscillate longitudinally and laterally and mounted on said cradle for adjustment conformably with both the boat and float types of aircraft, means to adjust the positions of said abutment members and mechanism mounted on said cradle operable from ashore to center an aircraft above said abutment members when said cradle is in the water.

4. Improvement in apparatus for launching and beaching aircraft of the seaplane and amphibian types via a slipway, comprising a cradle composed of a longitudinal beam and at least one transverse beam, a plurality of wheels for supporting said cradle, aircraft-supporting members mounted on said transverse beam and articulated so as to be free to oscillate longitudinally and laterally of said transverse beam and aircraft-supporting members mounted on said longitudinal beams and articulated so as to be free to oscillate longitudinally and laterally of said longitudinal beams.

5. Improvement in apparatus for launching and beaching aircraft of the seaplane and amphibian types via a slipway, comprising a submersible cradle composed of a longitudinal beam and two transverse beams, a plurality of wheels adjustably connected to and supporting said cradle, oscillatable aircraft-supporting members mounted adjustably on each of said transverse beams and means capable of positioning said oscillatable supporting members on said cradle for accommodating various type of aircraft.

WILLIAM GORDON GLOVER.